No. 782,372. Patented February 14, 1905.

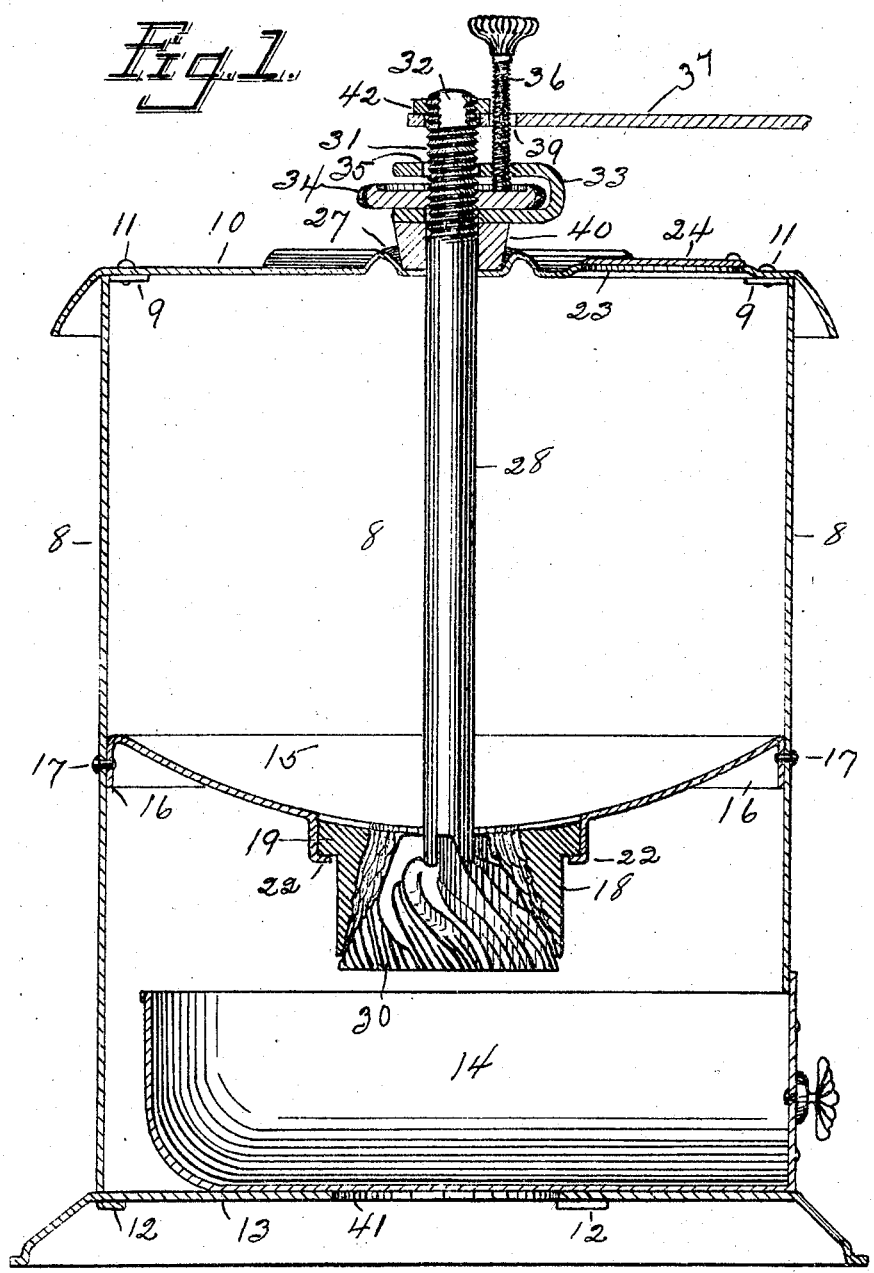

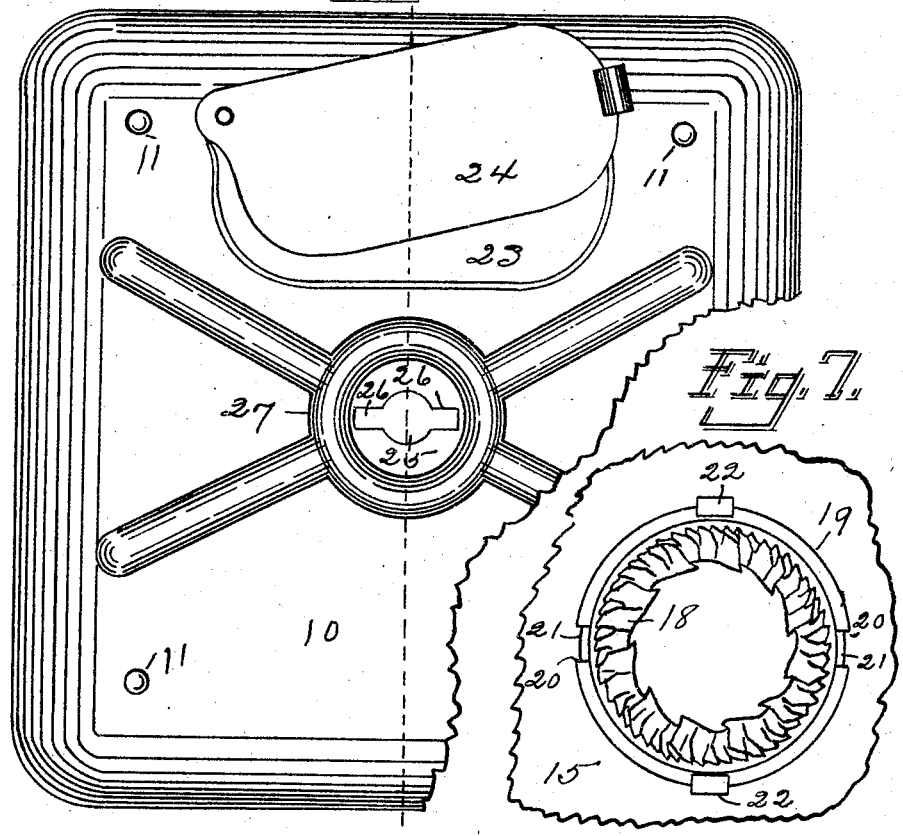

UNITED STATES PATENT OFFICE.

ALONZO ABNER WARNER, OF NEW BRITAIN, CONNECTICUT, ASSIGNOR TO LANDERS, FRARY AND CLARK, OF NEW BRITAIN, CONNECTICUT, A CORPORATION.

COFFEE OR SPICE MILL.

SPECIFICATION forming part of Letters Patent No. 782,372, dated February 14, 1905.

Application filed March 16, 1904. Serial No. 198,446.

*To all whom it may concern:*

Be it known that I, ALONZO ABNER WARNER, a citizen of the United States, residing at New Britain, in the county of Hartford and State of Connecticut, have invented new and useful Improvements in Coffee or Spice Mills, of which the following is a specification.

My invention relates to improvements in coffee and spice mills; and the objects of my improvements are simplicity and economy in construction and convenience and efficiency in use.

In the accompanying drawings, Figure 1 is a vertical section of the mill, partly in elevation, the plane of section being indicated by the line $x$ of Fig. 2. Fig. 2 is a plan view of the top, partly broken away. Fig. 3 is a reverse plan view of the bearing for the upper end of the spindle. Fig. 4 is a plan view of the adjusting-nut. Fig. 5 is a broken plan view showing the inner end of the crank. Fig. 6 is a plan view of the yoke for the adjusting-nut. Fig. 7 is a reverse plan view of the grinding-shell and a portion of the bottom of reservoir to which the said shell is attached.

The mill is of the box type and is mainly formed of sheet metal. The sides 8 are formed in one piece of sheet metal, having inwardly-turned lugs or flanges 9 at the upper end, by which to secure the sheet-metal top 10 by means of the rivets 11. At the lower end the said sides are provided with lugs or prongs 12, that are passed through suitable holes in the sheet-metal base 13 and clenched or bent on the under side, as shown in Fig. 1. An opening is made through one of the sides for the insertion of the drawer 14, which is also formed of sheet metal. The upper part of the box is formed into a reservoir or large hopper for coffee or other material to be ground by means of the sheet-metal bottom 15, having a flange 16 at its edge, so that the said bottom may be secured in place by rivets 17, as shown in Fig. 1. The grinding-shell 18 is formed of cast metal with a rim or shoulder 19 at its upper end, the said rim being provided with two vertical notches 20, that receive two downwardly-extending lugs 21, that are bent down from the said bottom 15, as shown in Fig. 7. Two other lugs, 22, also extend downwardly from the said bottom, the said lugs being longer than the lugs 21 and extend downwardly on the outside of the rim 19, so that their lower ends may be bent under the said rim or shoulder, as shown in Figs. 1 and 7.

The top 10 is provided with a loading-opening 23, over which is a swinging cover 24. At the center of the top 10 there is a spindle-opening 25, with side recesses 26 extending therefrom, as shown in Fig. 2, the said opening and recesses together forming a central vertical opening of an oblong form. An annular bead 27 is struck up around this opening 25 26, as shown. A separable spindle-bearing 40 is provided by a ring-shaped piece of cast metal bored to fit the upper end of the spindle 28 and having two projections 29, that enter and substantially fit the side walls of the recess 26 of the spindle-hole 25 in the top 10. The outer side of this spindle-bearing may also substantially fit the interior of the annular bead 27. The spindle 28 is provided at its lower end with a runner 30 of any approved construction. The upper portion of the spindle 28 is provided with a screw-thread portion 31 and a flattened driving portion 32 at the upper end of the threaded portion 31. A nut-yoke 33 is made by doubling a strip of metal upon itself into a substantially U shape, with a space between the two members or legs of the said yoke wide enough to receive the adjusting-nut 34, that is fitted to the screw-threaded portion 31 of the spindle 28. The yoke is also provided with openings 35 large enough to let the threaded portion 31 of the spindle 28 pass therethrough without obstruction. The upper member of the yoke 33 is also bored and threaded to receive the set-screw 36. The crank 37 is provided with a driving-opening 38, Fig. 5, to fit the angular or driving portion 32 at the upper end of the spindle 28 and also with an orifice 39 large enough to let the set-screw 36 pass freely therethrough.

In order to assemble the parts, the bearing 40 is placed on the top 10 with its projections 29 entered into the recesses 26. The runner 30 and spindle 28 are then inserted through the opening 41 left in the bottom for that purpose, (the drawer 14 being removed,) and the upper end of the said spindle is carried upwardly through the bearing 40. The adjusting-nut 34 is placed inside of the yoke 33 and then screwed on the spindle with the threaded portion extending through the holes or openings in the two members of the said yoke, so that the bottom member of the yoke rests on the top of the spindle-bearing and the nut rests upon the upper side of the said lower member of the yoke. The crank may then be put on and secured in place by the nut 42. Then passing the lower end of the set-screw 36 through the hole 39 in the crank and bringing the yoke into position with its doubled end in alinement with the crank the set-screw 36 can be inserted into the threaded hole 43, Fig. 6, and screwed down until its end bears on the top of the adjusting-nut 34 to hold the said nut in position against screwing up or down on the spindle. This also locks the yoke and nut to the crank, so that the said parts all revolve together with the spindle so long as the set-screw is screwed down firmly on the nut. The yoke as it revolves bears on the top of the spindle-bearing 40, which is fixed against rotation on the top 10 of the reservoir and which acts as a stop to hold the runner vertically in position. By turning the nut 34 the runner can be raised or lowered, as may be desired, to adjust it for coarse or fine grinding. The set-screw 36, connected with the crank and yoke, as described, constitutes means for necessitating the revolution of the yoke with the crank. The yoke only comes in frictional contact with the spindle-bearing 40, and hence there is little or no tendency to change the position of the adjusting-nut 34 even if not fastened in place; but the set-screw in addition to securing the yoke and crank together is also used to fasten the nut and make its position doubly sure.

I claim as my invention—

1. In a mill, the combination of a top having a spindle-bearing thereon with the spindle having a threaded portion projecting upwardly through the said bearing, a yoke of itself separate and distinct from all of the other parts and composed of two members with a space between, the nut fitted on the said threaded portion of the spindle between the two members of the said yoke, a crank mounted on the threaded upper end of the said spindle, the said crank having separate and distinct means for necessitating the revolution of the said yoke with the said crank.

2. In a mill, the combination of the mill-top having a central vertical opening of an oblong form and an annular bead around the said opening with a separable spindle-bearing having projections on its under face fitted to the side walls of the said opening and engaging therewith when the said bearing rests upon the said top, a spindle extending upwardly through the said separable bearing and devices on the spindle for transmitting the weight of the said spindle to the upper face of the said separable bearing.

3. In a grinding-mill, the combination of a box with the box mill-top, a spindle-bearing and adjusting devices mounted on the said mill-top, a sheet-metal bottom secured by its outer edges within the said box at a proper distance below the said mill-top to form a reservoir and having a central hole with two different sets of lugs extending downwardly by the edge of the said central hole in the said reservoir-bottom, the grinding-shell having a rim provided with vertical notches to receive one set of the said lugs on the said reservoir-bottom while the other set of lugs on the said reservoir-bottom extend downwardly at the outer edge of the rim of the said shell and have their ends clenched over on the under side of the said rim, and the combined spindle and runner mounted within the said spindle-bearing and shell substantially as described.

4. In a mill, the combination of the box-mill-top having a spindle-bearing thereon, with the spindle having a threaded portion projecting upwardly through the said bearing, the yoke composed of the two members with a space between, the nut fitted on the said threaded portion of the spindle between the two members of the said yoke, a crank for driving the said spindle and a set-screw mounted in a threaded hole in the upper member of the said yoke in position to engage the said nut and also to be engaged by the said crank and thereby serve as means for necessitating the revolution of the said yoke with the said crank.

ALONZO ABNER WARNER.

Witnesses:
G. M. LANDERS,
E. F. HALL.